US012789519B2

(12) United States Patent
Odum et al.

(10) Patent No.: US 12,789,519 B2
(45) Date of Patent: Nov. 10, 2026

(54) LAMINATED ARTICLE AND METHOD OF FORMING SAME

(71) Applicant: Shaw Industries Group, Inc., Dalton, GA (US)

(72) Inventors: Thomas Odum, Tunnel Hill, GA (US); Alex Davidson, Dalton, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 19/189,448

(22) Filed: Apr. 25, 2025

(65) Prior Publication Data

US 2025/0296313 A1 Sep. 25, 2025

Related U.S. Application Data

(63) Continuation of application No. 19/101,165, filed as application No. PCT/US2023/029515 on Aug. 4, 2023.

(Continued)

(51) Int. Cl.
*B32B 37/12* (2006.01)
*B32B 3/30* (2006.01)

(Continued)

(52) U.S. Cl.
CPC ............ *B32B 37/1284* (2013.01); *B32B 3/30* (2013.01); *B32B 7/12* (2013.01); *B32B 37/0053* (2013.01);

(Continued)

(58) Field of Classification Search
CPC ... B32B 37/1284; B32B 7/12; B32B 37/0053; B32B 37/06; B32B 38/06; B32B 38/14;

(Continued)

(56) References Cited

U.S. PATENT DOCUMENTS 4,892,336 A * 1/1990 Kaule .................. B42D 25/324 359/741
5,122,212 A * 6/1992 Ferguson ............. B41M 7/0027 156/543

(Continued)

FOREIGN PATENT DOCUMENTS

CN 112793113 A * 5/2021 ............. B29C 59/04
DE 102017100735 A1 * 7/2018 ............. B32B 27/40

(Continued)

OTHER PUBLICATIONS

CN112793113.*

(Continued)

*Primary Examiner* — Sonya M Sengupta
(74) *Attorney, Agent, or Firm* — Fish & Richardson P.C.

(57) ABSTRACT

An article having a printed image and an embossed in register (EIR) layer is disclosed, the article having a longitudinal axis and a transverse axis that is perpendicular to the longitudinal axis. The article comprises a substrate having a first side. The printed image is positioned on the first side of the substrate. The printed image comprises at least one identifier. The printed image is positioned between the EIR layer and the substrate. The printed image has a pattern, and the EIR layer has a corresponding pattern that is aligned with the pattern of the printed image along the longitudinal axis and the transverse axis.

19 Claims, 8 Drawing Sheets

Related U.S. Application Data

(60) Provisional application No. 63/411,829, filed on Sep. 30, 2022, provisional application No. 63/395,610, filed on Aug. 5, 2022.

(51) Int. Cl.

| | |
|---|---|
| ***B32B 7/12*** | (2006.01) |
| ***B32B 37/00*** | (2006.01) |
| ***B32B 37/06*** | (2006.01) |
| ***B32B 38/00*** | (2006.01) |
| ***B32B 38/06*** | (2006.01) |
| ***B32B 38/14*** | (2006.01) |
| ***B32B 38/18*** | (2006.01) |
| ***B32B 39/00*** | (2006.01) |
| ***B32B 41/00*** | (2006.01) |
| ***B41F 19/00*** | (2006.01) |
| ***B41F 19/02*** | (2006.01) |
| ***B44C 1/00*** | (2006.01) |
| ***B44C 1/24*** | (2006.01) |

(52) U.S. Cl.
CPC .............. *B32B 37/06* (2013.01); *B32B 38/06* (2013.01); *B32B 38/14* (2013.01); *B32B 38/145* (2013.01); *B32B 38/1825* (2013.01); *B32B 39/00* (2013.01); *B32B 41/00* (2013.01); *B41F 19/001* (2013.01); *B41F 19/007* (2013.01); *B41F 19/02* (2013.01); *B32B 2038/0076* (2013.01); *B32B 2250/02* (2013.01); *B32B 2250/05* (2013.01); *B32B 2255/26* (2013.01); *B32B 2307/4023* (2013.01); *B32B 2307/584* (2013.01); *B32B 2307/75* (2013.01); *B32B 2310/0831* (2013.01); *B32B 2419/04* (2013.01); *B32B 2471/00* (2013.01); *B32B 2607/00* (2013.01); *B44C 1/005* (2013.01); *B44C 1/24* (2013.01)

(58) Field of Classification Search
CPC ... B32B 38/145; B32B 38/1825; B32B 39/00; B32B 41/00; B32B 2038/0076; B32B 2250/02; B32B 2307/4023; B32B 2307/75; B32B 2310/0831; B32B 2419/04; B32B 3/30; B32B 2255/10; B32B 2255/26; B32B 5/02; B32B 27/12; B32B 27/40; B44C 5/04; B44C 1/005; B44C 1/24; B41M 3/06; B41J 3/407; B41J 3/44; B41F 19/001; B41F 19/007; B41F 19/02
See application file for complete search history.

(56) References Cited

U.S. PATENT DOCUMENTS

| | | | | |
|---|---|---|---|---|
| 6,829,969 | B1 | 12/2004 | Sullivan | |
| 10,259,204 | B2 | 4/2019 | Wright et al. | |
| 12,318,808 | B2 * | 6/2025 | Pervan | B41M 5/0029 |
| 2003/0010427 | A1 * | 1/2003 | Cruz | E04F 15/02 156/209 |
| 2003/0167717 | A1 * | 9/2003 | Garcia | B32B 3/30 52/311.1 |
| 2004/0086678 | A1 * | 5/2004 | Chen | B44C 5/0461 428/44 |
| 2004/0130057 | A1 * | 7/2004 | Mehrabi | B29C 59/04 264/284 |
| 2005/0257880 | A1 * | 11/2005 | Herring | B42D 25/387 156/243 |
| 2006/0005498 | A1 * | 1/2006 | Sabater | B44F 9/02 52/589.1 |
| 2007/0070503 | A1 * | 3/2007 | Boswell | G03H 1/028 359/566 |
| 2007/0246932 | A1 * | 10/2007 | Heine | B42D 25/425 427/144 |
| 2007/0273146 | A1 * | 11/2007 | Davis | B42D 25/425 283/91 |
| 2008/0017717 | A1 * | 1/2008 | Miyazaki | G06K 7/10574 235/472.01 |
| 2009/0317595 | A1 * | 12/2009 | Brehm | B42D 25/324 430/326 |
| 2010/0092731 | A1 * | 4/2010 | Pervan | B32B 27/04 118/200 |
| 2015/0061280 | A1 * | 3/2015 | Power | B42D 25/351 264/1.36 |
| 2016/0144433 | A1 * | 5/2016 | Stoffel | B29C 59/026 264/447 |
| 2017/0120474 | A1 * | 5/2017 | Oldorff | B44C 5/04 |
| 2017/0144427 | A1 * | 5/2017 | Klackmann-Schneider | E04F 15/163 |
| 2017/0361952 | A1 * | 12/2017 | Küffner | B41M 1/24 |
| 2018/0134016 | A1 | 5/2018 | Burns et al. | |
| 2018/0258588 | A1 * | 9/2018 | Pearson | D21F 1/105 |
| 2019/0299583 | A1 * | 10/2019 | Rose | B32B 27/12 |
| 2021/0229414 | A1 * | 7/2021 | Ko | B41F 19/02 |
| 2021/0370654 | A1 * | 12/2021 | Burns | B32B 3/06 |
| 2022/0032603 | A1 * | 2/2022 | Zhou | B41F 33/0081 |
| 2022/0161519 | A1 * | 5/2022 | Burns | D04H 1/498 |
| 2022/0379650 | A1 * | 12/2022 | McKillip | B41F 19/001 |
| 2024/0052643 | A1 * | 2/2024 | Boucké | B32B 9/047 |
| 2024/0092096 | A1 * | 3/2024 | Pfeiffer | B41J 11/00212 |
| 2024/0116307 | A1 * | 4/2024 | Macor | B44C 1/1733 |
| 2024/0140079 | A1 * | 5/2024 | Li | B44C 3/025 |
| 2024/0246316 | A1 * | 7/2024 | Boucké | E04F 13/18 |
| 2024/0416672 | A1 * | 12/2024 | Crassous | B42D 25/351 |

FOREIGN PATENT DOCUMENTS

| | | | | | |
|---|---|---|---|---|---|
| DE | 102022111097 | B3 * | 6/2023 | | B42D 25/387 |
| EP | 2942207 | A1 * | 11/2015 | | B27N 3/02 |
| EP | 3037354 | A1 * | 6/2016 | | B65B 7/01 |
| EP | 4008561 | A1 * | 6/2022 | | B41M 7/00 |
| FR | 2966269 | A1 * | 4/2012 | | B42D 25/41 |
| KR | 20030010427 | A * | 2/2003 | | |
| KR | 20040086678 | A * | 10/2004 | | G08G 1/123 |
| KR | 20060005498 | A * | 1/2006 | | H04N 5/50 |
| KR | 20070070503 | A * | 7/2007 | | G02F 1/1333 |
| KR | 20080017717 | A * | 2/2008 | | |
| KR | 20100092731 | A * | 8/2010 | | F16L 3/1008 |
| KR | 20150061280 | A * | 6/2015 | | C21D 8/0226 |
| KR | 20160144433 | A * | 12/2016 | | B60G 7/001 |
| KR | 20170120474 | A * | 10/2017 | | B65D 27/14 |
| KR | 20220032603 | A * | 3/2022 | | C12Q 1/6886 |
| KR | 20240052643 | A * | 4/2024 | | A61P 17/02 |
| KR | 20240116307 | A * | 7/2024 | | H04B 5/72 |
| KR | 20240140079 | A * | 9/2024 | | A61B 5/14503 |
| WO | WO-2004039551 | A2 * | 5/2004 | | B29C 35/0888 |
| WO | WO-2005051675 | A2 * | 6/2005 | | B41F 11/02 |
| WO | WO-2005080089 | A1 * | 9/2005 | | B42D 25/29 |
| WO | WO-2006018232 | A1 * | 2/2006 | | B42D 25/373 |
| WO | WO-2008017362 | A2 * | 2/2008 | | B32B 27/28 |
| WO | WO-2009065769 | A2 * | 5/2009 | | B32B 21/13 |
| WO | 2010042999 | | 4/2010 | | |
| WO | WO-2014202041 | A1 * | 12/2014 | | B22F 10/20 |
| WO | WO-2018157086 | A1 * | 8/2018 | | D21H 27/02 |
| WO | WO-2019231294 | A1 * | 12/2019 | | B41M 5/50 |
| WO | 2021116026 | | 6/2021 | | |
| WO | WO-2022144944 | A1 * | 7/2022 | | B05D 3/12 |
| WO | WO-2022148754 | A1 * | 7/2022 | | B32B 19/02 |
| WO | WO-2022248690 | A1 * | 12/2022 | | E04F 15/105 |

OTHER PUBLICATIONS

DE102017100735.*
DE102022111097.*
EP2942207.*
Non-Final Office Action for U.S. Appl. No. 19/189,416, dated Jun. 18, 2025.
Final Office Action for U.S. Appl. No. 19/189,416, dated Oct. 1, 2025.

(56) References Cited

OTHER PUBLICATIONS

International Search Report and Written Opinion in International Appln. No. PCT/US2023/029515, mailed on Jan. 12, 2024, 5 pages.

* cited by examiner

LAMINATED ARTICLE AND METHOD OF FORMING SAME

CROSS-REFERENCE TO RELATED APPLICATIONS

This is a continuation of U.S. application Ser. No. 19/101,165, filed Feb. 4, 2025, which is a national phase filing under 35 U.S.C. § 371 of International Application No. PCT/US2023/029515, filed Aug. 4, 2023, which claims priority to and the benefit of the filing date of U.S. Provisional Patent Application No. 63/395,610, filed Aug. 5, 2022, and of U.S. Provisional Patent Application No. 63/411,829, filed Sep. 30, 2022, the entirety of each of which is hereby incorporated by reference herein.

FIELD

This application relates to articles having printed patterns and corresponding embossed patterns that are aligned with the printed patterns.

BACKGROUND

Articles can be formed to have a particular aesthetic by combining a digitally printed image with a corresponding embossed in register (EIR) layer to provide texture. Digital printing on substrates and having a corresponding EIR layer requires a substantial quantity of liquid material that needs to be deposited onto the substrate. The quantity of liquid causes problems with contraction of the materials, making the board curl and reducing image clarity. Moreover, generally matching the EIR layer with the digitally printed image is difficult and prone to error. Accordingly, a way to spatially match the digitally printed image with the EIR layer is desirable.

SUMMARY

Disclosed herein, in one aspect, is an article having a longitudinal axis and a transverse axis that is perpendicular to the longitudinal axis. The article includes a substrate having a first side. A printed image is positioned on the first side of the substrate. The printed image comprises at least one identifier. The article further includes an embossed in register (EIR) layer, wherein the printed image is positioned between the EIR layer and the substrate. The printed image has a pattern. The EIR layer has a corresponding pattern that is aligned with the pattern of the printed image along the longitudinal axis and the transverse axis.

A method comprises applying a printed image to a substrate on a first side of the substrate. The printed image having at least one identifier. An EIR layer is applied on a side of the printed image opposite the substrate. Applying the EIR layer includes using at least one identifier to match a pattern of the printed image with a corresponding pattern of the EIR layer.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

Figure 2:
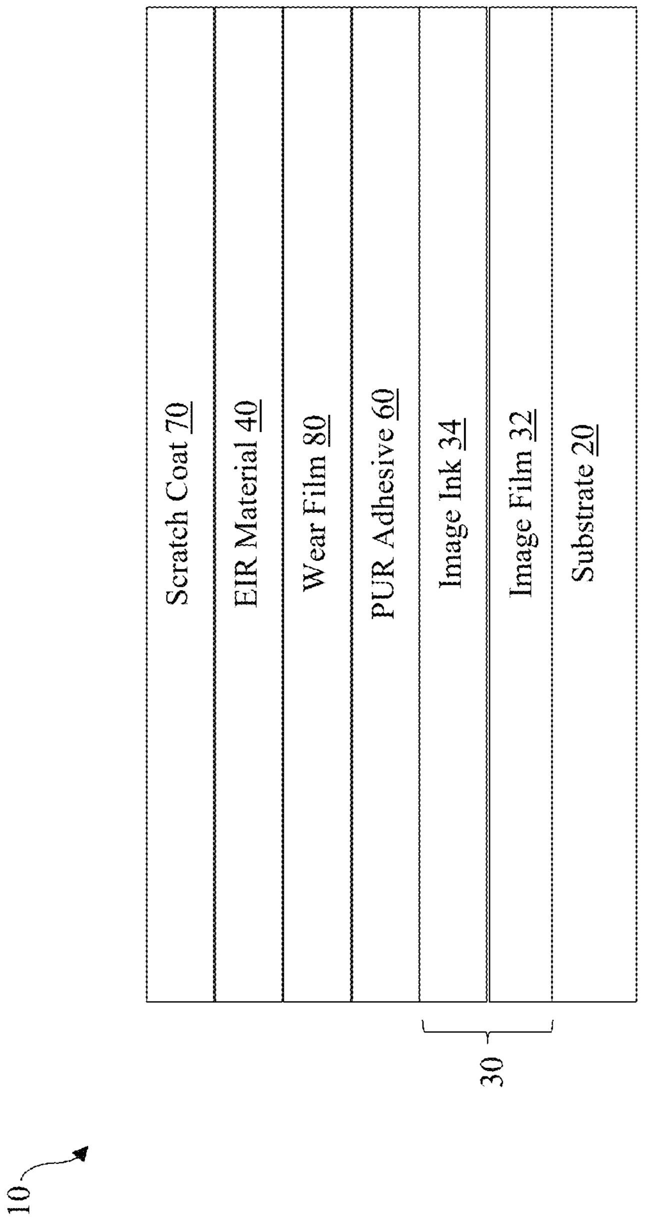
FIG. 2 is a block diagram of a cross section of the article of FIG. 1 according to a first aspect.
Figure 3:
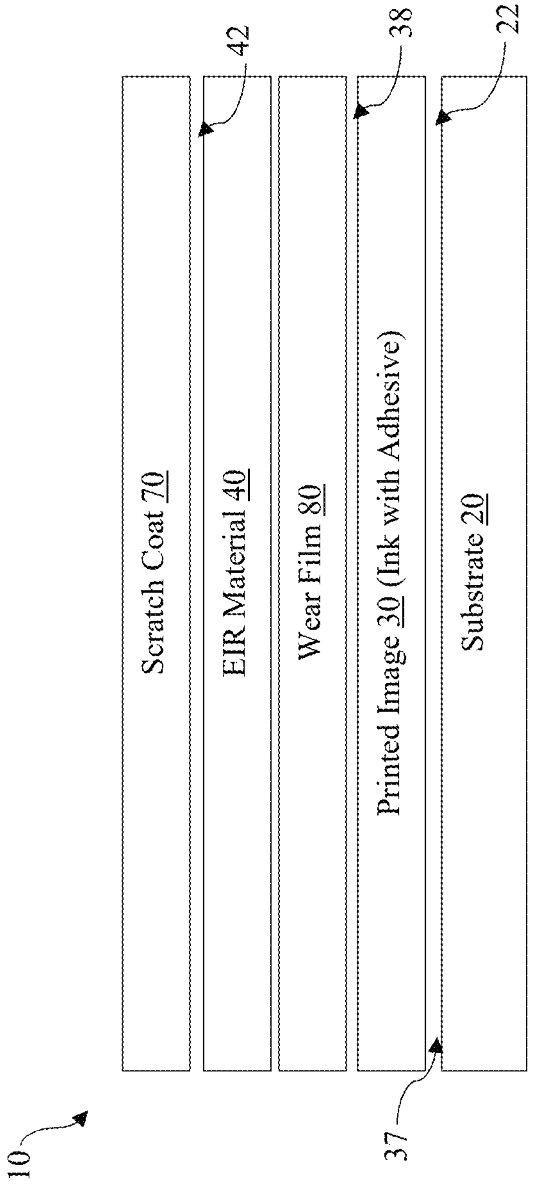
FIG. 3 is a block diagram of a cross section of the article of FIG. 1 according to a second aspect.
Figure 4:
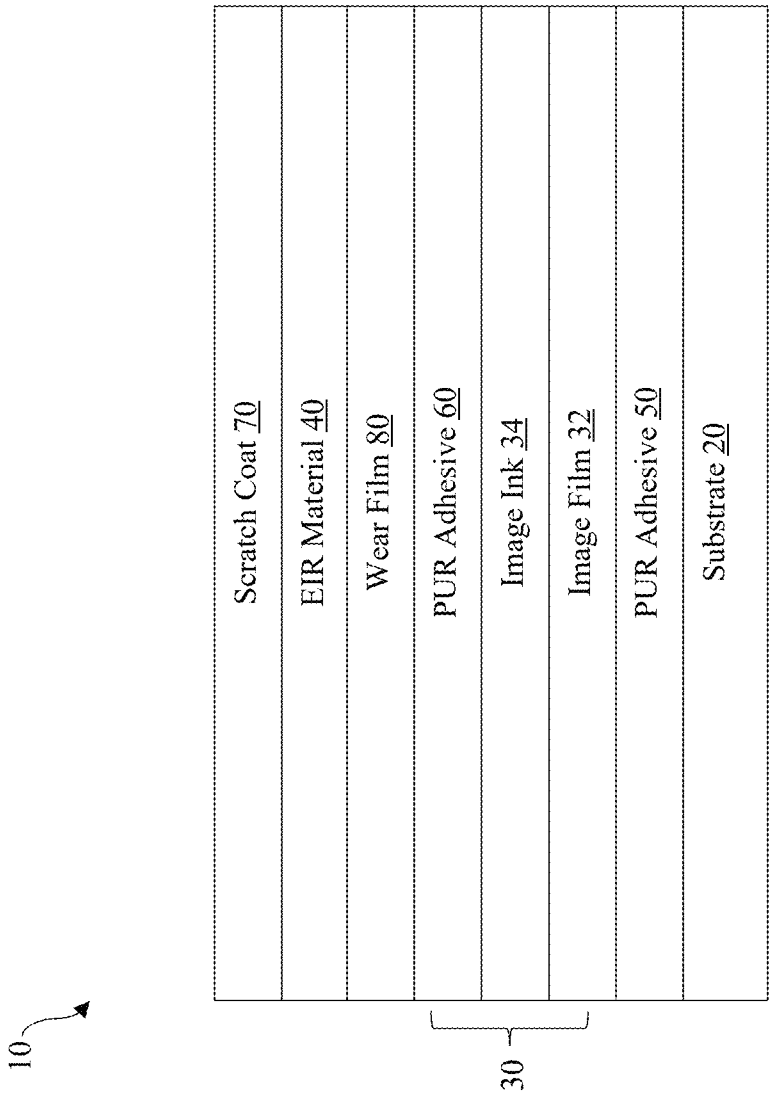
FIG. 4 is a block diagram of a cross section of the article of FIG. 1 according to a third aspect.

The relative thicknesses of the layers in FIGS. 2-4 are not necessarily shown to scale. Although the schematic diagram shown in FIG. 3 includes spaces between respective layers of the article, it should be understood that these spaces are provided in order to permit labeling of particular sides of individual layers of the articles. Thus, it is understood that articles manufactured in accordance with the disclosure will not include spaces between respective layers.

DETAILED DESCRIPTION

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" can optionally include plural references unless the context clearly dictates otherwise. Thus, for example, reference to "a layer" can include one or more of such layers, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values or characteristics are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Disclosed herein are laminated articles having (a) a printed image having a pattern and (b) an embossed texture. As used herein, a pattern need not be a repeating pattern, although it may. Generally, the term "pattern" generally refers to a decorative image, in the case of the printed pattern or a decorative profile, in the case of an embossed pattern. As used herein, "texture" refers to variation in a surface profile. For example, the texture can have the surface variation of a wooden board. In some aspects, the laminated articles can be surface covering articles, such as, for example, floor covering or wall covering articles. In other aspects, the laminated articles can themselves provide the structure of the surface (e.g., floor or wall).

Figure 1:
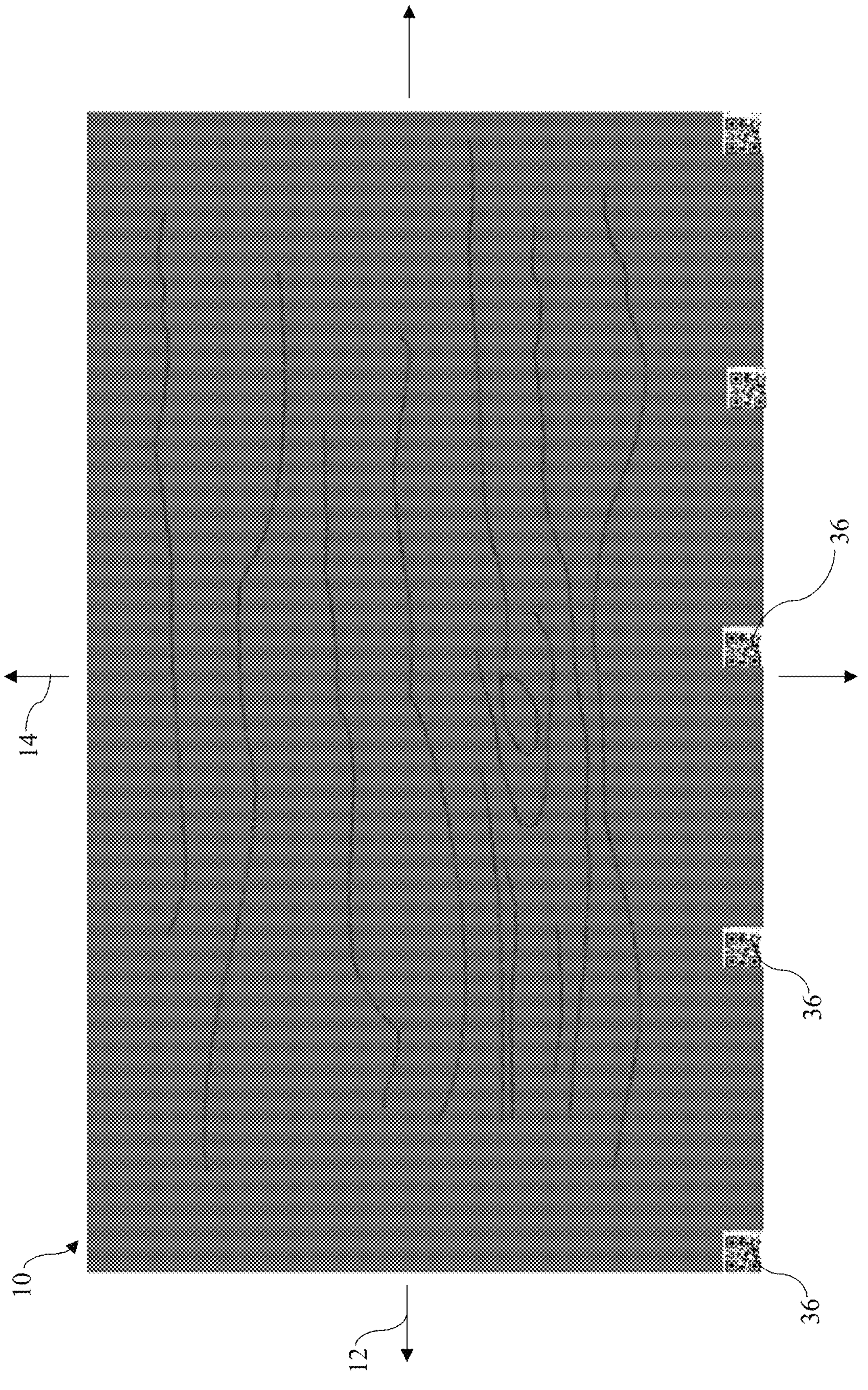
FIG. 1 is a top view of an article as disclosed herein.

Referring to FIGS. 1 and 2, in some aspects, an article 10 can have a longitudinal axis 12 and a transverse axis 14 that is perpendicular to the longitudinal axis. The article 10 can comprise a substrate 20 (also sometimes referred to in the art as a core). In various optional aspects, the substrate 20 can comprise stone polymer composite (SPC), luxury vinyl tile (LVT), wood polymer composite (WPC), medium density fiber (MDF), magnesium oxide (MgO), gypsum. In additional optional aspects, the substrate 20 can comprise olefin. An exemplary aspects, the substrate 20 can further comprise fiberglass. For example, the substrate 20 can be embodied as the substrate described in U.S. Pat. No. 10,259,204, issued Apr. 16, 2019, the entirety of which is hereby incorporated by reference herein. In other aspects, the substrate 20 can be free of fiberglass. In some optional aspects, the substrate 20 can comprise a densified fiber batt, such as, for example, that which is disclosed in U.S. Patent Application Publication No. 2018/0134016A1 ("the '016 publication"), published May 17, 2018, the entirety of which is hereby incorporated by reference herein for all purposes.

As shown in FIG. 3, the substrate 20 can have a first side 22. A printed image 30 can be positioned on the first side 22 of the substrate 20.

The article 10 can further comprise an embossed in register (EIR) layer 40. The EIR layer 40 can be added to the article 10 so that the printed image is positioned between the EIR layer and the substrate.

The printed image 30 can have a pattern. The EIR layer 40 can have a corresponding pattern that is aligned with the pattern of the printed image 30 along the longitudinal axis 12 and the transverse axis 14. For example, printed image 30 can have a wood grain, and the EIR layer 30 can have a wood texture. The printed image of the wood grain and the wood texture of the EIR layer can coincide so that the article 10 has the appearance of wood, both in surface profile and in color/visual pattern. In various other aspects, the pattern of the printed image can comprise a stone pattern, a geometric pattern, an organic pattern, or combinations thereof.

The printed image 30 can comprise at least one identifier 36 (optionally, a plurality of identifiers 36 that are spaced along the longitudinal axis 12). The at least one identifier 36 can permit alignment of the pattern of the printed image 30 with the corresponding pattern of the EIR layer 40. For example, referring to FIGS. 5-6, a digital EIR printer can comprise, or be in communication with, a camera, laser scanner, or other optical capture device that can capture the at least one identifier 36 of the printed image 30, and the digital EIR printer can coordinate printing based on the captured at least one identifier 36. It is contemplated that the at least one identifier 36 can indicate or be associated with at least a pattern and a spatial location of the pattern relative to the identifier(s). For example, it is contemplated that the at least one identifier 36 can be associated with a corresponding texture for an EIR as further disclosed herein.

It is still further contemplated that the at least one identifier 36 can provide data that is indicative of stretch or shrink of the printed image 30. For example, if the printed image 30 is subject to stretch, the at least one identifier 36 can correspondingly stretch. Similarly, if the printed image 30 is subject to shrinking, the at least one identifier 36 can correspondingly shrink. Still further, the at least one identifier 36 can stretch or shrink in different proportions in both the longitudinal dimension (along the longitudinal axis 12) and the transverse dimension (along the transverse axis 14). The printing of the digital EIR printer can be scaled (e.g., stretched or compressed) to match the printed image 30, based on the amount of stretch or shrink of the at least one identifier 36, as captured by the camera, laser scanner, or other optical capture device.

In further or alternative aspects, the article 10 can comprise at least one identifier that is not optically capturable. For example, the identifier can comprise a radio frequency identifier (RFID), a magnetic identifier, or other suitable identifier that can identify both a pattern and a special location of the pattern relative to the identifier. The non-optically capturable identifier can be, for example, embedded within or coupled to the substrate 20. In various aspects, the article 10 can comprise a plurality of non-optically capturable identifiers that are spaced along the longitudinal axis. The non-optically capturable identifier can be used to align the pattern of the printed image with the corresponding pattern of the EIR layer.

Optionally, the at least one identifier 36 can be positioned on or adjacent an edge of the article 10. In this way, the edge can be removed (e.g., trimmed off) to remove the identifier 36 (for example, in a final processing step prior to packaging, shipment/transport, and/or installation). Optionally, at least one identifier 36 can be a plurality of identifiers 36 having equal spacing along the longitudinal axis 12. In further aspects, the plurality of identifiers 36 can have unequal spacing along the longitudinal axis 12. The plurality of identifiers 36 can be positioned to account for shrinkage or stretching of the printed image during printing or lamination.

In various aspects, the at least one identifier 36 can be a barcode (or barcodes). Optionally, the barcodes can be 2D barcodes, such as, for example, QR codes or data matrices. In other aspects, the at least one identifier 36 can be a 1D barcode. In yet further aspects, the at least one identifier 36 can be any optically recognizable element.

In other aspects, the identifiers 36 can be at least a portion of the pattern of the printed image 30. For example, a camera can capture at least a portion of the printed image, and a computing device can identify the printed image based on the captured printed image (or portion thereof).

In some optional aspects, and with reference to FIGS. 2 and 4, the printed image 30 can comprise a film 32 and ink 34 printed on the film. (As used herein, the term "film" should be understood to include foil.) Optionally, the film 32 can be applied to (or otherwise coupled to) the substrate, and the ink 34 can subsequently be printed thereon. In alternative aspects, the ink 34 can be printed on the film 32, and the film can subsequently be applied to (or otherwise coupled to) the substrate 20. In some aspects, the ink 34 can comprise UV-cured ink. A layer of adhesive 60 (e.g., polyurethane reactive (PUR) adhesive) can be disposed between the printed image 30 and the EIR layer 40 (and, optionally, where a wear layer is provided as further disclosed herein, between the wear layer and the printed image). The layer of adhesive 60 can be a primer that can permit bonding to the printed layer 30.

In some aspects, and with reference to FIG. 3, the substrate 20 can comprise fiber core. For example, the substrate 20 can comprise a densified fiber batt. The fiber core can comprise a plurality of fibers that are bonded together to form a structurally stable core, as further described in the '016 publication. In these aspects, the article 10 can further comprises a layer of adhesive 50 (e.g., PUR adhesive) (FIG. 4) disposed between the substrate 20 and the printed image 30. In other aspects, and as illustrated in FIG. 3, the layer of adhesive 50 and/or the layer of adhesive 60 (FIG. 4) can be omitted, as the printed image 30 comprising ink with adhesive can provide adhesion to the substrate and other layers. Optionally, in these aspects, the structure article 10 can be heat-laminated. It is contemplated that the article of FIG. 4 does not include adhesive within the ink. In these aspects, the layer(s) of adhesive (e.g., PUR adhesive) can permit binding between adjacent layers.

Figure 7:
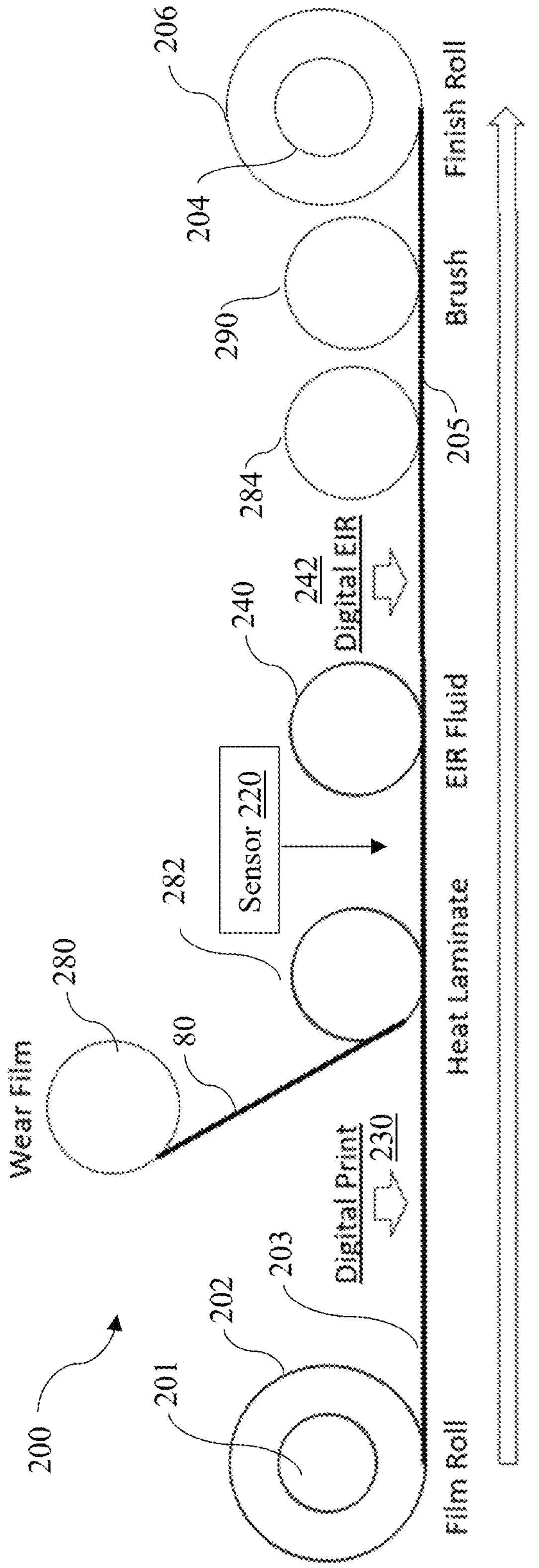
FIG. 7 is a block diagram of a system for printing and embossing on a film in a roll-to-roll configuration.

In some exemplary aspects, and with further reference to FIG. 7, the printed image and EIR layer can be provided on a film, and the film can be rolled into a finish roll. In a subsequent operation, the film from the finish roll can be applied to a substrate. In this way, the film from the finish roll can be coupled to a substrate to provide both a printed pattern and a textured pattern as an assembly. In some optional aspects, an adhesive can be used to adhere the film to the substrate. In other aspects, the film can be coupled to the substrate without adhesive (e.g., using heat lamination). Referring to FIG. 2, in some aspects, further layers in addition to the substrate and the layers from the product on the finish roll can be laminated to form the article 10. For example, a scratch coat 70 can be applied to the product of the finish roll. Optionally, the substrate and the product from the finish roll can be laminated to form a subassembly, and the scratch coat 70 can be applied to the laminated subassembly.

In some aspects, the printed image 30 does not comprise a film. For example, in some aspects, the printed image 30 can comprise water-based ink. Optionally, in these aspects, the printed image can comprise adhesive. Accordingly, in some aspects, the layer of adhesive between the printed image 30 and the EIR layer 40 (or wear layer 80, when present) can be omitted. That is, the printed image 30 can have a first side 37 facing the substrate 20 and an opposed second side 38, and the article 10 does not comprise a layer of adhesive on the second side 38 of the printed image.

The article 10 can optionally comprise a scratch coat layer 70 positioned on a side of the EIR layer opposite the substrate.

The article 10 can optionally comprise a wear layer 80 positioned between the printed image 30 and the EIR layer 40 (e.g., optionally, between the layer of adhesive 60 (e.g., PUR adhesive) and the EIR layer 40). The layer of wear layer 80 can further serve as a base gloss for the embossable material. The gloss of the wear layer 80 can match a gloss of a top of the article (e.g., a scratch coat layer 70, as further described herein) to provide a realistic look of the article.

In the aspects where the wear layer 80 is present, the wear layer can comprise, for example and without limitation, conventional ionomers, polyethylene terephthalate (PET), polyurethane, polyurethane reactive hotmelt adhesive (PUR) polypropylene, polytrimethylene terephthalate (PTT), polyamide, polyvinyl chloride (PVC), and the like. In a further aspect, the wear layer can comprise surlyn resin, such as, for example and without limitation, Surlyn® 1706 resin, manufactured by E.I. du Pont de Nemours and Company, Inc, or Incor PUR supplied by Kleiberit or Henkel. In a still further aspect, the wear layer can comprise heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), high density polyethylene (HDPE), low density polyethylene (LDPE), or a copolymer thereof.

In some aspects, the layers of adhesive (e.g., the layers of adhesive 50 and 60 (FIG. 4)) can be UV-cured adhesive. It is further contemplated that the layer(s) of adhesive (e.g., layers of PUR adhesive) can be cured using electron-beam (E-beam) technology. That is, one or more electron beams can be used to cure the adhesive. Optionally, in these aspects, when using E-beam technology to cure the adhesive(s), it is contemplated that photo-initiator can be omitted from the curable layer. For example, in one embodiment, the adhesive does not include a photo-initiator. In other aspects, the adhesive does include a photo-initiator. It is further contemplated alternative adhesives to PUR adhesives can be used. Accordingly, wherever embodiments describe a layer of PUR adhesive, it should be understood that further embodiments are contemplated in which another adhesive is contemplated. For example, ethylene vinyl acetate (EVA), Ethylene Acrylic Acid (EAA), or methacrylic acid (MAA) can be used as layer of adhesive. In some optional aspects, the EVA, EAA, or MAA can be grafted with maleic anhydride. In these aspects, a roll coater, extruder, or off-winding system can be used to apply the adhesive layers. For example, the off-winding system can comprise adhesive material provided on a roll. The adhesive material can be unrolled from the roll and laminated with the substrate 20, as described further herein.

Systems for Making Articles

Figure 5:
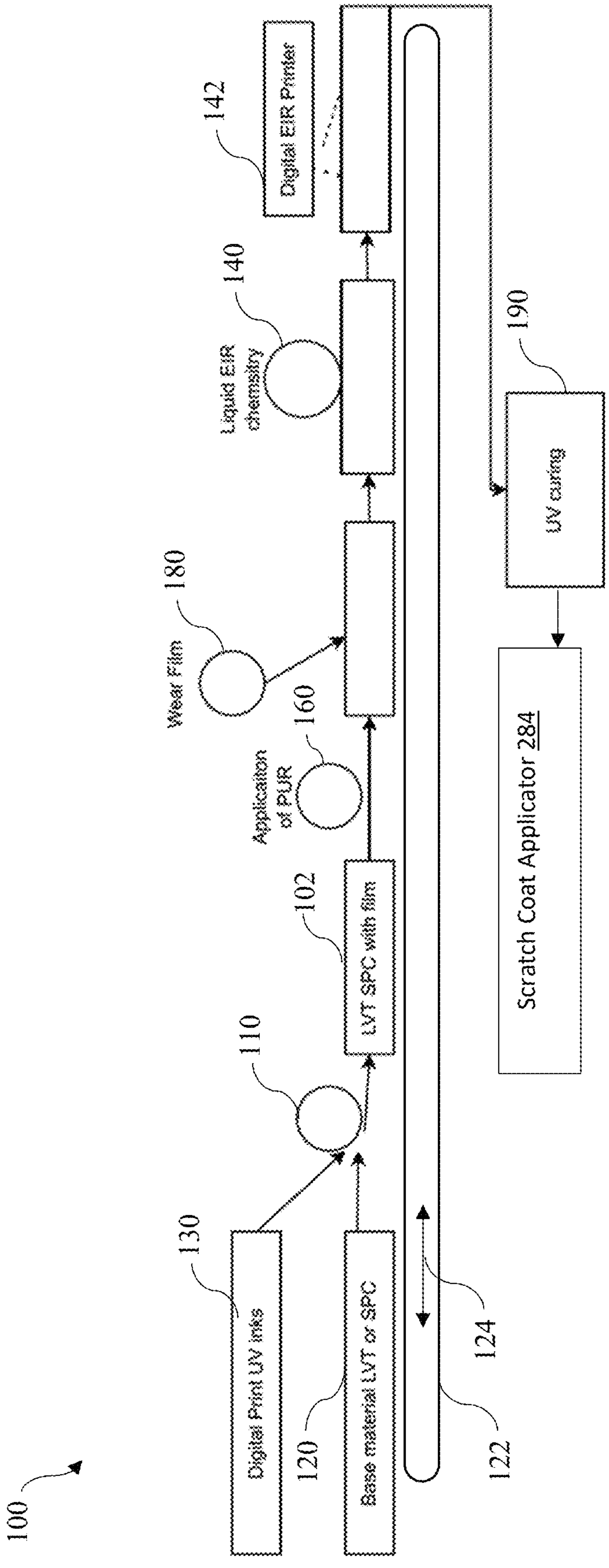
FIG. 5 is a block diagram of a system for making an article as disclosed herein.

Referring to FIGS. 2 and 5, a system 100 for making articles as disclosed herein can comprise a supply 120 of the substrate 20 and a supply 130 of the printed image 30 (e.g., ink 34 on film 32). A conveyor 122 can be configured to move the substrate 120 along a substrate movement axis 124. The system 100 can comprise a lamination roller 110 that laminates the substrate 20 and printed image 30 to form a subassembly 102. The layer of adhesive 60 (e.g., PUR adhesive) can be added to the subassembly by a roller 160 (or by other adhesive layer application systems, as described herein, such as an extruder or off-winding system). The wear layer 80 can be applied to the subassembly from a wear layer supply 180. A first apparatus 140 can deposit embossable material (e.g., liquid chemistry, such as, for example, lacquer) for the EIR layer 40 onto the subassembly. The first apparatus 140 can be, for example, a roll coater as is known in the art. The roll coater can be configured to apply a desired thickness of embossable material. An EIR printer 142 (e.g., a digital EIR printer) can subsequently form the corresponding pattern of the EIR layer into the embossable material. A UV curing apparatus 190 (e.g., an area comprising one or more UV lights) can cure the embossable material (after said embossable material has been embossed with the EIR printer).

Figure 6:
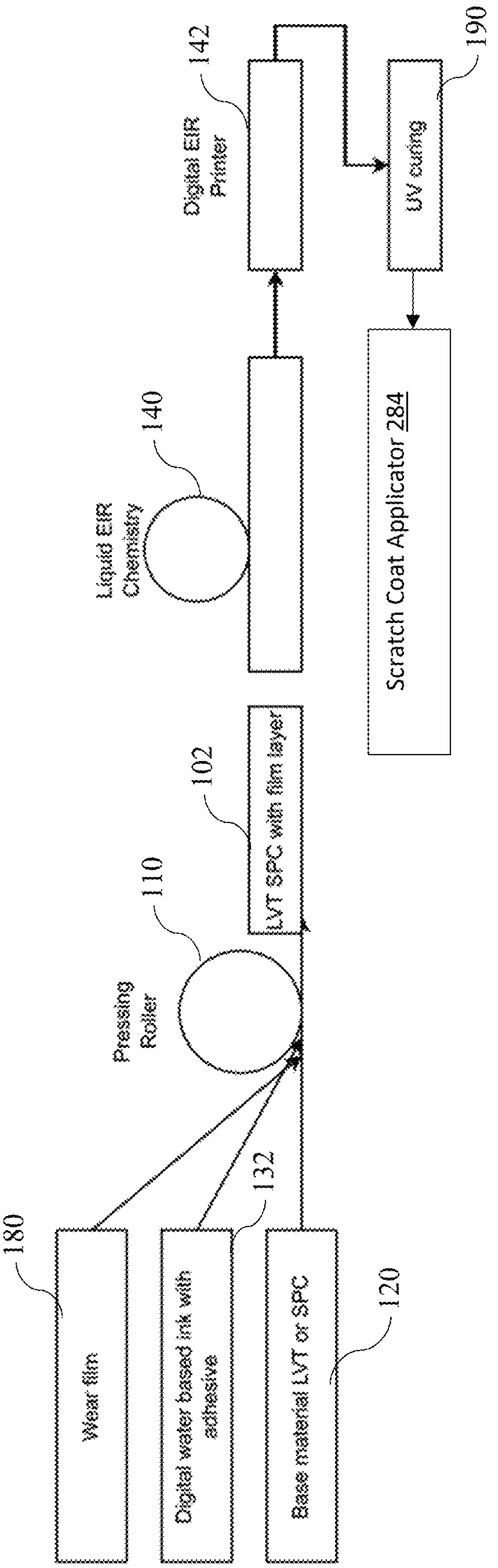
FIG. 6 is a block diagram of another system for making an article as disclosed herein.

Referring to FIGS. 3 and 6, a system 100 for making articles as disclosed herein can comprise a supply 120 of the substrate 20, a printer 132 for printing the printed image 30, and a wear layer supply 180. The system 100 can comprise a lamination (pressing) roller 110 that laminates the substrate 20, printed image 30, and wear layer 80 to form a subassembly 102. A first apparatus 140 can deposit embossable material (e.g., liquid chemistry, such as, for example, lacquer) for the EIR layer 40 onto the subassembly. Subsequently, an EIR printer 142 (e.g., a digital EIR printer) can subsequently form the corresponding pattern of the EIR layer into the embossable material. In aspects comprising UV-curable ink, a UV curing apparatus 190 (e.g., an area comprising one or more UV lights) can cure the embossable material.

Referring to FIGS. 5-6, the EIR printer 142 can comprise, or be in communication with, a camera, laser scanner, or other optical capture device that can capture the at least one identifier 36 of the printed image 30, and the EIR printer 142 can coordinate printing based on the captured at least one identifier 36. In some optional aspects, the camera, laser scanner, or other optical capture device can be integral to the EIR printer 142 itself. In other optional aspects, and as illustrated in FIG. 7, the camera, laser scanner, or other optical capture device (sensor 220) can be separate from the EIR printer 142, 242. Said stand-alone sensor 220 can optionally be positioned upstream of the first apparatus 140 for depositing embossable material.

Referring to FIG. 7, in some optional aspects, a system 200 can be configured to form a product comprising a printed image and corresponding pattern of an EIR layer on a roll. Said product can then be coupled to a substrate in a subsequent operation. The system 200 can comprise a supply roll spindle 201 that is configured to receive a supply roll 202 comprising film 203. The system 200 can further comprise a take-up roll spindle 204 that is configured to wind product 205 onto a finish roll 206. A first apparatus 240 can be configured to deposit embossable material. A sensor 220 can be configured to detect at least one identifier of a printed image. In exemplary aspects, the at least one identifier can be associated with a location for a corresponding pattern of an EIR layer relative to the printed image. A digital EIR printer 242 can be configured to form the corresponding pattern of the EIR layer into the embossable material based on the sensor detecting the at least one identifier.

Optionally, the system 200 can comprise a printer 230 that is configured to print the printed image onto the film. In alternative aspects, the system 200 can be configured to receive a supply roll comprising film having a printed image thereon. In these aspects, the printer can be omitted from the system 200.

In some aspects, the system 200 can comprise a wear film supply 280 comprising wear film 80. A roller 282 can be configured to apply the wear film 80 to the film 203. In some optional aspects, the roller 282 can be a heat laminating roller. In alternative aspects, an adhesive can adhere the wear film 80 to the film 203 (e.g., a layer of adhesive 60 (FIG. 2) can adhere the wear film 80 to the film 203 (FIG. 7)).

In some aspects, the EIR printer 142, 242 can comprise one or more fluid jets (e.g., nozzles) that form a pattern into the EIR layer 40. Once the pattern is formed into the EIR layer 40, the EIR layer 40 can be cured (e.g., via UV curing) to fix the pattern of the EIR layer.

In some aspects, the EIR printer 142, 242 can comprise one or more nozzles that deposit material that restricts UV curing. Accordingly, in these aspects, the EIR layer 40 can be cured only in locations where said material that restricts UV curing is not present. Subsequently, the material that restricts UV curing and the embossable material therebelow can be removed (e.g., with a brush), thereby leaving valleys in the EIR layer 40. In these aspects, the system 200 can comprise a brush 290 (FIG. 7).

In some aspects, the EIR printer 142, 242 can comprise a mechanical embossing system. The EIR layer 40 can be impacted (e.g., with one or more hammers) to form the pattern in the EIR layer 40. The EIR layer can then be cured (e.g., via UV curing). Optionally, prior to impacting the EIR layer 40, the EIR layer can be cured via b-curing (wherein the reaction between resin and curing agent/hardener is not complete) prior to being impacted to form the pattern.

In some optional aspects, the system 100 can comprise a roller that is configured to form the EIR layer 40. For example, in some aspects, the roller can be electrostatically charged to retain thereto a layer having a negative of the profile of the EIR layer 40. A dispenser can apply the structure to the roller that is the negative of the profile of the desired EIR layer. For example, the dispenser can apply the EIR layer as a plurality of particles that are electrostatically adhered to the roller. The roller can rotate at a synchronized speed with the underlying substrate and create an embossing on the EIR layer (e.g., partially cured UV embossing chemistry). The particles can then be removed from the roller using a mechanical device (e.g., a wipe). Any particles embedded in the EIR layer 40 can be removed (e.g., brushed off) after a second UV curing stage.

Referring also to FIG. 7, in some aspects, a scratch coat 70 can be applied on a side 42 of the EIR layer 40 opposite the substrate 20 via a scratch coat applicator 284. In some aspects, the scratch coat applicator 284 can be positioned before the brush 290 (where included). In other aspects, the scratch coat applicator 284 can be omitted. For example, optionally, in these aspects, the EIR layer 40 can be scratch-resistant and, therefore, serve as the scratch coat.

Method for Making Articles

A method for making the articles disclosed herein can comprise applying the printed image 30 to the substrate 20 on the first side 22 of the substrate. The printed image 30 can have at least one identifier 36 (optionally, a plurality of identifiers 36 spaced along the longitudinal axis 12).

The EIR layer 40 can be applied on a side (the second side 37) of the printed image 30 opposite the substrate 20. The EIR layer 40 can be applied using the at least one identifier 36 to match the pattern of the printed image 30 with the corresponding pattern of the EIR layer 40.

Optionally, ink 34 can be printed on the film 32, and the film 32 can be coupled to the substrate with the ink printed thereon. In alternative aspects, the ink 34 can be printed on the film 32 with the film coupled to the substrate. In still further aspects, the printed image 30 does not comprise a film. For example, ink (e.g., water-based ink) can be printed onto the substrate or an intervening layer.

Optionally, the ink can be ultraviolet-curable ink (UV-curable ink). Accordingly, the method can comprise curing the UV-curable ink.

Optionally, adhesive can be printed with the printed image 30, as illustrated in FIG. 3.

The EIR layer 40 can be applied on the side 37 of the printed image 30 opposite the substrate 20 by optically capturing at least one identifier 36 and aligning the corresponding pattern of the EIR layer 40 with the pattern of the printed image based on the optically captured at least one identifier. For example, referring also to FIG. 5, a first apparatus 140 can deposit embossable material for the EIR layer onto an unfinished laminated structure that ultimately forms a portion of the article. Subsequently, an EIR printer 142 (e.g., a digital EIR printer) can form the corresponding pattern of the EIR layer into the liquid chemistry.

Optionally, a layer of adhesive (e.g., PUR adhesive) can be deposited to form an intervening layer between the substrate and the printed image (e.g., in aspects in which the core comprises fiber core). In other aspects, the printed image can comprise an adhesive. Optionally, in these aspects, the layer of adhesive can be omitted.

In some aspects, the printed image 30 can have a first side 37 facing the substrate and an opposed second side 38, and the method of making the article does not comprise applying a layer of adhesive (e.g., PUR adhesive) on the second side of the printed image.

In some aspects, a scratch coat 70 can be applied on a side 42 of the EIR layer 40 opposite the substrate 20.

In some aspects, a wear layer 80 can be applied before the EIR layer so that the wear layer 80 is positioned between the printed image 30 and the EIR layer 40.

Exemplary Computing Device

Figure 8:
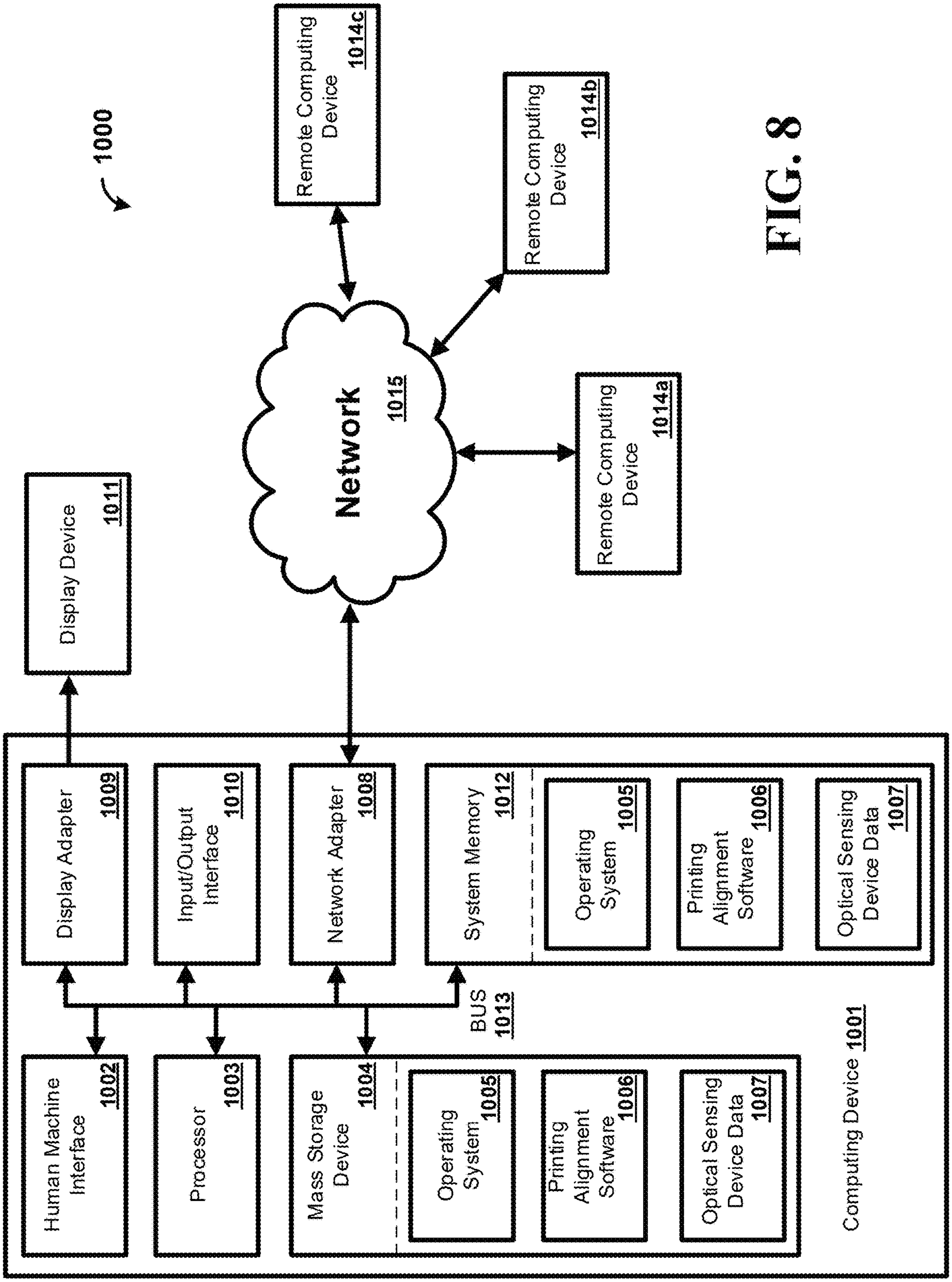
FIG. 8 is a block diagram of an operating environment comprising a computing device for operating the systems for making an article as disclosed herein.

FIG. 8 shows an exemplary operating environment 1000 including an exemplary configuration of a computing device 1001 for use with the system 100 (FIG. 5) disclosed herein. The computing device 1001 can be configured to associate the one or more identifiers 36 (FIG. 1) with a digital EIR pattern to print to form the pattern of the EIR layer. The computing device 1001 can further be configured to position and, optionally, scale the digital EIR pattern to align the digital EIR pattern with the printed image 30 (FIG. 2).

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as optical sensing device data 1007 and/or program modules such as operating system 1005 and printing alignment software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and printing alignment software 1006 may be stored on the mass storage device 1004. One or more of the operating system 1005 and printing alignment software 1006 (or some combination thereof) may comprise program modules and the printing alignment software 1006. The optical sensing device data 1007 may also be stored on the mass storage device 1004. The optical sensing device data 1007 may be stored in any of one or more databases known in the art. The databases may be centralized or distributed across multiple locations within the network 1015.

A user may enter commands and information into the computing device 1001 using an input device. Such input devices comprise, but are not limited to, a joystick, a touchscreen display, a keyboard, a pointing device (e.g., a computer mouse, remote control), a microphone, a scanner, tactile input devices such as gloves, and other body coverings, motion sensor, speech recognition, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. The remote computing devices 1014*a,b,c*, can perform respective operations of the system 100. For example, one remote computing device 1014*a* can be a controller of a first pivotable structure 22. One remote computing device 1014*b* can control a second pivotable structure 24. Logical connections between the computing device 1001 and a remote computing device 1014*a,b,c* may be made using a network 1015, such as a local area network (LAN) and/or a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014*a,b,c* can optionally have some or all of the components disclosed as being part of computing device 1001. In various further aspects, it is contemplated that some or all aspects of data processing described herein can be performed via cloud computing on one or more servers or other remote computing devices. Accordingly, at least a portion of the operating environment 1000 can be configured with internet connectivity.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An article having a longitudinal axis and a transverse axis that is perpendicular to the longitudinal axis, the article comprising:

- a substrate having a first side;
- a printed image positioned on the first side of the substrate, wherein the printed image comprises at least one identifier; and
- an embossed in register (EIR) layer, wherein the printed image is positioned between the EIR layer and the substrate,
- wherein the printed image has a pattern, wherein the EIR layer has a corresponding pattern that is aligned with the pattern of the printed image along the longitudinal axis and the transverse axis.

Aspect 2: The article of aspect 1, wherein the substrate comprises fiber core, wherein the article further comprises a layer of adhesive disposed between the substrate and the printed image.

Aspect 3: The article of aspect 2, wherein the layer of adhesive disposed between the substrate and the printed image comprises polyurethane reactive (PUR) adhesive.

Aspect 4: The article of aspect 1, wherein the printed image comprises a film and an ink printed thereon.

Aspect 5: The article of aspect 3, wherein the ink comprises UV-cured ink.

Aspect 6: The article of aspect 1, wherein the printed image does not comprise a film.

Aspect 7: The article of any one of the preceding aspects, wherein the printed image comprises water-based ink.

Aspect 8: The article of aspect 7, wherein the printed image comprises adhesive.

Aspect 9: The article of aspect 7 or aspect 8, wherein the printed image has a first side facing the substrate and an opposed second side, wherein the article does not comprise a layer of adhesive on the second side of the printed image.

Aspect 10: The article of any one of the preceding aspects, further comprising a scratch coat positioned on a side of the EIR layer opposite the substrate.

Aspect 11: The article of any one of the preceding aspects, further comprising a wear layer positioned between the printed image and the EIR layer.

Aspect 12: The article of any one of the preceding aspects, wherein the at least one identifier is optically capturable to permit alignment of the pattern of the printed image with the corresponding pattern of the EIR layer.

Aspect 13: The article of aspect 12, wherein the at least one identifier comprises a barcode.

Aspect 14: The article of aspect 13, wherein the barcode is a 2D barcode.

Aspect 15: The article of aspect 14, wherein the 2D barcode is a QR code or data matrix.

Aspect 16: The article of any one of the preceding aspects, wherein the pattern of the printed image comprises a wood grain pattern, a geometric pattern, an organic pattern, a stone pattern, or combination of images.

Aspect 17: The article of any one of the preceding aspects, wherein the at least one identifier comprises a plurality of identifiers spaced along the longitudinal axis.

Aspect 18: A method comprising:

- applying a printed image to a substrate on a first side of the substrate, wherein the printed image comprises at least one identifier;
- applying an EIR layer on a side of the printed image opposite the substrate, wherein applying the EIR layer comprises using at least one identifier to match a pattern of the printed image with a corresponding pattern of the EIR layer.

Aspect 19: The method of aspect 18, wherein applying the printed image to the substrate comprises printing ink on a film with the film coupled to the substrate.

Aspect 20: The method of aspect 18, wherein applying the printed image to the substrate comprises printing ink on a film and then applying the film with the ink printed thereon to the substrate.

Aspect 21: The method of any one of aspects 18-20, wherein the ink comprises UV-curable ink, the method further comprising curing the UV-curable ink.

Aspect 22: The method of any one of aspects 18-21, wherein applying the EIR layer on the side of the printed image opposite the substrate comprises:

optically capturing at least one identifier of the at least one identifier;

aligning the corresponding pattern of the EIR layer with the pattern of the printed image based on the optically captured at least one identifier.

Aspect 23: The method of any one of aspects 18-22, wherein the substrate comprises fiber core, wherein the method further comprises depositing a layer of adhesive between the substrate and the printed image.

Aspect 24: The method of aspect 23, wherein the layer of adhesive disposed between the substrate and the printed image comprises polyurethane reactive (PUR) adhesive.

Aspect 25: The method of any one of aspects 18 or 23-4, wherein the printed image does not comprise a film.

Aspect 26: The method of any one of aspects 18 or 23-24, wherein the printed image comprises water-based ink.

Aspect 27: The method of aspect 26, wherein the printed image comprises adhesive.

Aspect 28: The method of aspect 26 or aspect 27, wherein the printed image has a first side facing the substrate and an opposed second side, wherein the method does not comprise applying a layer of adhesive on the second side of the printed image.

Aspect 29: The method of any one of aspects 18-28, further comprising applying a scratch coat on a side of the EIR layer opposite the substrate.

Aspect 30: The method of any one of aspects 18-29, further comprising applying a wear layer between the printed image and the EIR layer.

Aspect 31: The method of any one of aspects 18-30, wherein the at least one identifier is optically capturable to permit alignment of the pattern of the printed image with the corresponding pattern of the EIR layer.

Aspect 32: The method of aspect 31, wherein the at least one identifier comprises a barcode.

Aspect 33: The method of aspect 32, wherein the barcode is a 2D barcode.

Aspect 34: The method of aspect 33, wherein the 2D barcode is a QR code or a data matrix.

Aspect 35: The method of any one of aspects 18-34, wherein the pattern comprises a wood grain pattern, a geometric pattern, an organic pattern, a stone pattern, or combination of images.

Aspect 36: The method of any one of aspects 18-35, wherein the at least one identifier comprises a plurality of identifiers spaced along the longitudinal axis.

Aspect 37: An article having a longitudinal axis and a transverse axis that is perpendicular to the longitudinal axis, the article comprising:

a substrate having a first side;

a printed image positioned on the first side of the substrate;

an embossed in register (EIR) layer, wherein the printed image is positioned between the EIR layer and the substrate; and an identifier;

wherein the printed image has a pattern, wherein the EIR layer has a corresponding pattern that is aligned with the pattern of the printed image along the longitudinal axis and the transverse axis, wherein the identifier identifies the corresponding pattern of the EIR layer and a location of the corresponding pattern of the EIR layer relative to the identifier.

Aspect 38: The article of aspect 37, wherein the identifier is non-optically capturable.

Aspect 39: The article of aspect 37, wherein the identifier is optically capturable.

Aspect 40: A method comprising:

applying a printed image to a substrate on a first side of the substrate to form a subassembly, wherein the subassembly comprises at least one identifier; and applying an EIR layer on a side of the printed image opposite the substrate, wherein applying the EIR layer comprises using at least one identifier to match a pattern of the printed image with a corresponding pattern of the EIR layer.

Aspect 41: A system comprising:

a supply roll spindle that is configured to receive a supply roll comprising film thereon;

a take-up roll spindle that is configured to wind product onto a finish roll;

a first apparatus that is configured to deposit embossable material;

a sensor that is configured to detect at least one identifier of a printed image, wherein the at least one identifier is associated with a location for a corresponding pattern of an EIR layer relative to the printed image; and a digital EIR printer that is configured to form the corresponding pattern of the EIR layer into the embossable material based on the sensor detecting the at least one identifier.

Aspect 42: The system of aspect 41, further comprising a printer that is configured to print the printed image.

Aspect 43: The system of aspect 41, wherein the system is configured to receive a supply roll comprising film having a printed image thereon, wherein the system does not comprise a printer for printing the printed image.

Aspect 44: The system of any one of aspects 41-43, further comprising:

a wear film supply comprising wear film; and a roller that is configured to apply the wear film to the film.

Aspect 45: The system of aspect 44, wherein the heat roller is a heat laminating roller.

Aspect 46: The system of any one of aspects 41-45, further comprising a brush.

Aspect 47: The system of any one of aspects 41-46, further comprising a supply roll on the supply roll spindle.

Aspect 48: A laminated article comprising:

a film;

a printed image positioned on the first side of the film, wherein the printed image comprises at least one identifier; and an embossed in register (EIR) layer, wherein the printed image is positioned between the EIR layer and the film, wherein the printed image has a pattern, wherein the EIR layer has a corresponding pattern that is aligned with the pattern of the printed image along the longitudinal axis and the transverse axis.

Aspect 49: The article of aspect 48, wherein the laminated article is formed into a roll.

Aspect 50: A method comprising:

applying a printed image to a film on a first side of the film, wherein the printed image comprises at least one identifier; and applying an EIR layer on a side of the printed image opposite the film, wherein applying the EIR layer comprises using at least one identifier to match a pattern of the printed image with a corresponding pattern of the EIR layer.

Aspect 51: A method comprising:

applying a printed image to a film on a first side of the film, wherein the printed image comprises at least one identifier; and applying an EIR layer on a side of the printed image opposite the film, wherein applying the EIR layer comprises using at least one identifier to match a pattern of the printed image with a corresponding pattern of the EIR layer.

Aspect 52: The method of aspect 51, further comprising rolling the film into a finish roll.

Aspect 53: The method of aspect 52, further comprising coupling the film to a substrate.

Aspect 54: The method of aspect 53, wherein coupling the film to the substrate comprises adhering the film to the substrate with an adhesive.

Aspect 55: The method of aspect 54, wherein coupling the film to the substrate comprises heat laminating the film to the substrate.

Aspect 56: The method of aspect 55, wherein heat laminating the film to the substrate does not comprise using an adhesive.

Aspect 57: A system comprising:

a conveyor that is configured to move a substrate along a substrate movement axis;

a first apparatus that is configured to deposit embossable material onto the substrate;

a sensor that is configured to detect at least one identifier of a printed image on the substrate, wherein the at least one identifier is associated with a location for a corresponding pattern of an EIR layer relative to the printed image; and a digital EIR printer that is configured to form the corresponding pattern of the EIR layer into the embossable material based on the sensor detecting the at least one identifier.

Aspect 58: The system of aspect 57, further comprising a printer that is configured to print the printed image.

Aspect 59: The system of aspect 57, further comprising a lamination roller that is configured to laminate the substrate and a film comprising the printed image.

Aspect 60: The system of any one of aspects 57-59, further comprising a UV curing station.

Aspect 61: The system of any one of aspects 57-60, further comprising:

a wear film supply comprising wear film; and a roller that is configured to apply the wear film to the substrate.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A system comprising:

a supply roll spindle that is configured to receive a supply roll comprising film thereon;

a take-up roll spindle that is configured to wind product onto a finish roll;

a first printer that is configured to print a printed image including at least one identifier;

a first apparatus that is configured to deposit embossable material;

a sensor that is configured to detect the at least one identifier of the printed image, wherein the at least one identifier is associated with a location for a corresponding pattern of an EIR layer relative to the printed image; and a second printer, wherein the second printer is a digital EIR printer that is configured to form the corresponding pattern of the EIR layer into the embossable material based on the sensor detecting the at least one identifier.

2. A system comprising:

a supply roll spindle that is configured to receive a supply roll comprising film thereon;

a take-up roll spindle that is configured to wind product onto a finish roll;

a first apparatus that is configured to deposit embossable material;

a sensor that is configured to detect at least one identifier of a printed image, wherein the at least one identifier is associated with a location for a corresponding pattern of an EIR layer relative to the printed image;

a digital EIR printer that is configured to form the corresponding pattern of the EIR layer into the embossable material based on the sensor detecting the at least one identifier;

a wear film supply comprising wear film; and a roller that is configured to apply the wear film to the film.

3. The system of claim 2, wherein the roller is a heat laminating roller.

4. A system comprising:

a supply roll spindle that is configured to receive a supply roll comprising film thereon;

a take-up roll spindle that is configured to wind product onto a finish roll;

a first apparatus that is configured to deposit embossable material;

a sensor that is configured to detect at least one identifier of a printed image, wherein the at least one identifier is associated with a location for a corresponding pattern of an EIR layer relative to the printed image;

a digital EIR printer that is configured to form the corresponding pattern of the EIR layer into the embossable material based on the sensor detecting the at least one identifier; and a brush.

5. The system of claim 1, further comprising a supply roll on the supply roll spindle.

6. A system comprising:

a conveyor that is configured to move a substrate along a substrate movement axis;

a first printer that is configured to print a printed image including at least one identifier;

a first apparatus that is configured to deposit embossable material onto the substrate;

a sensor that is configured to detect the at least one identifier of the printed image on the substrate, wherein the at least one identifier is associated with a location for a corresponding pattern of an EIR layer relative to the printed image;

a second printer, wherein the second printer is a digital EIR printer that is configured to form the corresponding pattern of the EIR layer into the embossable material based on the sensor detecting the at least one identifier.

7. The system of claim 6, further comprising a lamination roller that is configured to laminate the substrate and a film comprising the printed image.

8. The system of claim 6, further comprising a UV curing station.

9. A system comprising:

a conveyor that is configured to move a substrate along a substrate movement axis;

a first apparatus that is configured to deposit embossable material onto the substrate;

a sensor that is configured to detect at least one identifier of a printed image on the substrate, wherein the at least one identifier is associated with a location for a corresponding pattern of an EIR layer relative to the printed image;

a digital EIR printer that is configured to form the corresponding pattern of the EIR layer into the embossable material based on the sensor detecting the at least one identifier;

a wear film supply comprising wear film; and a roller that is configured to apply the wear film to the substrate.

10. The system of claim 2, wherein the digital EIR printer is a second printer, wherein the system further comprises a first printer that is configured to print the printed image.

11. The system of claim 2, wherein the system is configured to receive a supply roll comprising film having a printed image thereon, and wherein the system does not comprise a printer for printing the printed image.

12. The system of claim 2, further comprising a brush.

13. The system of claim 2, further comprising a supply roll on the supply roll spindle.

14. The system of claim 4, wherein the digital EIR printer is a second printer, wherein the system further comprises a first printer that is configured to print the printed image.

15. The system of claim 4, wherein the system is configured to receive a supply roll comprising film having a printed image thereon, and wherein the system does not comprise a printer for printing the printed image.

16. The system of claim 9, wherein the roller is a heat laminating roller.

17. The system of claim 9, wherein the digital EIR printer is a second printer, wherein the system further comprises a first printer that is configured to print the printed image.

18. The system of claim 9, further comprising a lamination roller that is configured to laminate the substrate and a film comprising the printed image.

19. The system of claim 9, further comprising a UV curing station.

* * * * *